United States Patent
Bell et al.

(10) Patent No.: US 11,732,081 B2
(45) Date of Patent: Aug. 22, 2023

(54) HCFO-CONTAINING ISOCYANATE-REACTIVE COMPOSITIONS, RELATED FOAM-FORMING COMPOSITIONS AND FLAME RETARDANT PUR-PIR FOAMS

(71) Applicant: Covestro LLC, Pittsburgh, PA (US)

(72) Inventors: Michael H. Bell, Morgantown, WV (US); Brandon W. Parks, McKees Rocks, PA (US); Eric C. Giles, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 220 days.

(21) Appl. No.: 17/341,898

(22) Filed: Jun. 8, 2021

(65) Prior Publication Data

US 2022/0389148 A1    Dec. 8, 2022

(51) Int. Cl.
| | | |
|---|---|---|
| C08G 18/40 | (2006.01) | |
| C08G 18/20 | (2006.01) | |
| C08G 18/76 | (2006.01) | |
| C08J 9/08 | (2006.01) | |
| C08J 9/12 | (2006.01) | |
| C08J 9/14 | (2006.01) | |
| C08L 67/03 | (2006.01) | |

(52) U.S. Cl.
CPC ..... C08G 18/4018 (2013.01); C08G 18/2081 (2013.01); C08G 18/7685 (2013.01); C08J 9/08 (2013.01); C08J 9/125 (2013.01); C08J 9/144 (2013.01); C08L 67/03 (2013.01); C08J 2375/06 (2013.01); C08J 2375/08 (2013.01)

(58) Field of Classification Search
CPC ............... C08G 18/18; C08G 18/2081; C08G 18/4018; C08G 18/4202; C08G 18/5024; C08G 18/7664; C08G 18/7685; C08G 2110/005; C08G 2110/0083; C08J 9/02; C08J 9/08; C08J 9/125; C08J 9/144; C08J 2203/02; C08J 2203/162; C08J 2375/06; C08J 2375/08; C08L 67/03
See application file for complete search history.

(56) References Cited

U.S. PATENT DOCUMENTS

| | | |
|---|---|---|
| 8,299,137 B2 | 10/2012 | Loh et al. |
| 9,556,303 B2 | 1/2017 | Ross et al. |
| 9,556,335 B2 | 1/2017 | Chen et al. |
| 9,809,674 B2 | 11/2017 | Shieh |
| 9,988,483 B2 | 6/2018 | Forkner et al. |
| 10,131,758 B2 | 11/2018 | Younes et al. |
| 10,392,487 B2 | 8/2019 | Taylor et al. |
| 11,053,340 B2 * | 7/2021 | Parks ............ C08J 9/144 |
| 11,161,931 B2 * | 11/2021 | Parks ............ C08G 18/4081 |
| 2007/0100009 A1 | 5/2007 | Creazzo et al. |
| 2010/0210747 A1 | 8/2010 | Loh et al. |
| 2010/0216904 A1 | 8/2010 | Loh et al. |
| 2011/0124756 A1 | 5/2011 | Singh et al. |
| 2012/0313035 A1 | 12/2012 | Williams et al. |
| 2014/0171525 A1 | 6/2014 | Yu et al. |
| 2014/0220333 A1 | 8/2014 | Bogdan et al. |
| 2015/0210818 A1 | 7/2015 | Loh |
| 2015/0232631 A1 | 8/2015 | Balbo Block et al. |
| 2016/0145374 A1 | 5/2016 | Ishikawa |
| 2016/0152739 A1 | 6/2016 | Eilbracht et al. |
| 2018/0022885 A1 | 1/2018 | Younes et al. |
| 2018/0134861 A1 * | 5/2018 | Schilling ............ C08G 18/482 |
| 2019/0136005 A1 | 5/2019 | Williams et al. |
| 2019/0194413 A1 | 6/2019 | Okada et al. |
| 2019/0322790 A1 | 10/2019 | Rider et al. |
| 2019/0322791 A1 | 10/2019 | Rider et al. |
| 2020/0283561 A1 * | 9/2020 | Parks ............ B32B 13/045 |
| 2020/0283563 A1 * | 9/2020 | Parks ............ C08G 18/1875 |
| 2020/0339733 A1 | 10/2020 | Rider et al. |

FOREIGN PATENT DOCUMENTS

| | | |
|---|---|---|
| CN | 103709727 A | 4/2014 |
| CN | 104497251 A | 4/2015 |
| WO | 2007053670 A2 | 5/2007 |
| WO | 2009014965 A1 | 1/2009 |
| WO | 2012105657 A1 | 8/2012 |
| WO | 2014134087 A1 | 9/2014 |
| WO | 2015050139 A1 | 3/2017 |
| WO | 2017050887 A1 | 3/2017 |
| WO | 2020223059 A1 | 11/2020 |

OTHER PUBLICATIONS

Covestro LLC; Baytherm 3199 Product Information sheet; Rigid Polyurethane Foam System; 2 pgs.

* cited by examiner

*Primary Examiner* — John M Cooney
(74) *Attorney, Agent, or Firm* — Donald R. Palladino

(57) ABSTRACT

HCFO-containing isocyanate-reactive compositions, foam-forming compositions containing such isocyanate-reactive compositions, rigid PUR-PIR foams made using such foam-forming compositions, and methods for producing such foams, including use of such foams as insulation in discontinuous foam panel applications. The isocyanate-reactive composition includes a polyol blend, a blowing agent composition, and a tertiary amine catalyst. The polyol blend includes: (1) an aromatic polyester polyol having a functionality of 1.5 to less than 2.5 and an OH number of 150 to 360 mg KOH/g; (2) an aromatic polyester polyol having a functionality of at least 2.5 and an OH number greater than 360 mg KOH/g, which is present in an amount of at least 10% by weight, based on the total weight of the aromatic polyester polyol in the polyol blend; and (3) an amine-initiated polyether polyol having an OH number of at least 500 mg KOH/g and a functionality of 2.5 to 4. The blowing agent composition includes a hydrochlorofluoroolefin and a carbon dioxide generating chemical blowing agent.

11 Claims, No Drawings

HCFO-CONTAINING ISOCYANATE-REACTIVE COMPOSITIONS, RELATED FOAM-FORMING COMPOSITIONS AND FLAME RETARDANT PUR-PIR FOAMS

FIELD

This specification pertains generally to hydrochlorofluoroolefin ("HCFO")-containing isocyanate-reactive compositions, foam-forming compositions containing such isocyanate-reactive compositions, rigid foams made using such foam-forming compositions, and methods for producing such foams, including use of such foams as panel insulation.

BACKGROUND

Flame-retardant rigid polyurethane foams are used in numerous industries. They are produced by reacting an appropriate polyisocyanate and an isocyanate-reactive compound, usually a polyol, in the presence of a blowing agent and catalysts to produce polyisocyanurate-containing and polyurethane-containing foams. One use of such foams is as a thermal insulation medium in the construction of panel assemblies, such as doors, including garage doors. The thermal insulating properties of closed-cell rigid foams are dependent upon a number of factors, including the average cell size and the thermal conductivity of the contents of the cells.

Chlorofluorocarbons (CFC's) and hydrogen-containing chlorofluorocarbons (HCFC's) have been used as blowing agents to produce these foams because of their exceptionally low vapor thermal conductivity. However, their ozone-depletion potential is a drawback to their use. Alternative blowing agents, such as hydrofluorocarbons (HFC's) are also used, but they are greenhouse gases. Hydrocarbons, such as pentane isomers, have also been used, but these are flammable and have lower energy efficiency. Halogenated hydroolefinic compounds, such as HCFOs, are now replacements for HFCs, since their chemical instability in the lower atmosphere provides for a low global warming potential and zero or near zero ozone depletion properties.

Formulations used to produce thermally insulating rigid polyurethane foam, particularly those used in the construction of panel assemblies, utilize catalysts to control the relative rates of water-polyisocyanate (gas-forming or blowing), the polyol-polyisocyanate (gelling) reaction to form polyurethane ("PUR"), and the isocyanate-isocyanate trimerization reaction to form polyisocyanurate ("PIR"). In the gelling reaction, the isocyanate reacts with polyols to form the polyurethane foam matrix. In the trimerization reaction, isocyanates react with one another to form macromolecules with isocyanurate structures (polyisocyanurates). In the blowing reaction, the isocyanate reacts with water in the formulation to form polyurea and carbon dioxide. While these reactions take place at different rates, it is necessary to properly balance them to produce high-quality foam. For example, if the blowing reaction occurs faster than the gelling reaction, the gas generated by the reaction may expand before the polyurethane matrix is strong enough to contain it and foam collapse can occur. In contrast, if the gelling reaction occurs faster than the blowing reaction, the foam cells will remain closed, causing the foam to shrink as it cools. Moreover, if the gelling reaction occurs while the reaction mixture is still flowing, cell stretching may occur, resulting in elongated cell structures. Foams with such elongated cell structures generally exhibit poorer physical properties, such as poorer compressive strength, poorer dimensional stability (more foam shrinkage), poorer thermal insulation properties, and poorer foam quality (due to surface voids and other defects).

As a result, to achieve the proper balance, formulations often utilize a combination of blow catalysts, gel catalysts, and/or trimerization catalysts. Amine catalysts, for example, are known to have a greater effect on the water-polyisocyanate blowing reaction, whereas organotin catalysts are known to have a greater effect on the polyol-polyisocyanate gelling reaction.

A drawback to at least some HCFOs as blowing agents in the production of satisfactory isocyanate-based foams is poor shelf-life. Blowing agents often are combined with polyols and other components, such as surfactant(s) and the catalyst(s), to form a so-called "B-side" pre-mix that may be stored for up to several months prior to being combined with an "A-side" isocyanate component to form the foam.

With certain HCFOs, however, if the B-side composition is aged prior to combining with the polyisocyanate, the foam can be of lower quality and may even collapse during the formation of foam. The poor foam structure is thought to be attributable to the reaction of certain catalysts, particularly amine catalysts, with these HCFOs which results in the partial decomposition of the blowing agent and, as a result, undesirable modification of silicone surfactants, resulting in poor foam structure and quality.

To combat this issue, certain amine catalysts have been identified that can exhibit substantially improved stability with HCFOs. Such catalysts, however, are not without some drawbacks. In addition to being relatively costly, they tend to be weak catalysts, thereby necessitating their use in relatively high loadings, which both amplifies the cost impact and limits the ability of a foam formulator to optimize the foam flow profile and quality. As a result, it would be desirable to identify ways to reduce the amount of such amine catalysts that are required in a formulation.

Foam-forming compositions used in the production of certain panel assemblies, particularly those produced in a discontinuous open and closed pour processes must exhibit a stringent combination of properties. For example, in addition to possessing good thermal insulation properties, in some cases a K-factor of 0.125 BTU-in/h-ft$^2$-° F. or lower, many foams must pass Class A E84 burn requirements for smoke and flame spread. To achieve this, the foam must exhibit a flame spread index (FSI) of 25 or less and a smoke-developed index (SDI) of 450 or less according to ASTM E84-21 at the applied foam thickness. They also must exhibit target cream and gel times conducive to the manufacturing equipment and process that is used, and they must exhibit a long shelf life, which means that this gel time cannot change by a large amount after storage of the foam-forming composition components for a long period of time (several months or more), even when a chemical blowing agent, such as water, is also used. The isocyanate-reactive composition used must also be phase stable in that it does do not exhibit any significant phase separation over time. The foams also must exhibit good dimensional stability (low foam shrinkage) even when the free-rise foams have a density of less than 2.0 lb/ft$^3$. A composition that can fulfill most, if not all, of these requirements, while utilizing a HCFO blowing agent would, therefore, before highly desirable.

SUMMARY

In certain respects, the present disclosure is directed to isocyanate-reactive compositions. These compositions comprise: (a) a polyol blend, (b) a blowing agent composition, and (c) a tertiary amine catalyst. The polyol blend comprises: (1) an aromatic polyester polyol having a functionality of 1.5 to less than 2.5 and an OH number of 150 to 360 mg KOH/g; (2) an aromatic polyester polyol having a functionality of at least 2.5 and an OH number greater than 360 mg KOH/g, which is present in an amount of at least 10% by weight, based on the total weight of the aromatic polyester polyol in the polyol blend; and (3) an amine-initiated polyether polyol having an OH number of at least 500 mg KOH/g and a functionality of 2.5 to 4. Aromatic polyester polyol is present in an amount of at least 50% by weight, based on the total weight of the polyol blend. The blowing agent composition comprises a physical blowing agent comprising a hydrochlorofluoroolefin and a carbon dioxide generating chemical blowing agent.

The present specification is also directed to foam-forming compositions that include such isocyanate-reactive compositions, rigid PUR-PIR foams produced from such foam-forming compositions, methods for making such rigid foams, and composite articles comprising such rigid foams, and panel insulation that includes such rigid foams.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

As indicated, certain implementations of the present specification relate to isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams of this specification are the reaction product of a polyurethane-foam forming composition that includes: (a) a polyisocyanate; and (b) an isocyanate-reactive composition. As used herein, the term "polyisocyanate" encompasses diisocyanates and other isocyanates having more than one isocyanate (—NCO) functional group per molecule.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive compositions described in this specification comprise a polyol blend. More specifically, the polyol blend comprises at least two different aromatic polyester polyols comprising: (1) aromatic polyester polyol having a functionality of 1.5 to less than 2.5 and an OH number of 150 to 360 mg KOH/g; and (2) an aromatic polyester polyol having a functionality of at least 2.5 and an OH number greater than 360 mg KOH/g, with aromatic polyester polyol (2) being present in an amount of at least 10% by weight, based on the total weight of aromatic polyester polyol that is in the polyol blend.

Suitable such aromatic polyester polyols include, for example, the reaction product of an aromatic diacid or anhydride with a suitable glycol and/or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT-5100 and HT-5500, or from Coim under the Isoexter trade name such as Isoexter® TB-375.

In some implementations, aromatic polyester polyol (1), which has a functionality of 1.5 to less than 2.5 and an OH number of 150 to 360 mg KOH/g, has an OH number of 200 to 335 mg KOH/g, or, in some cases, 200 to 250 mg KOH/g, and a functionality of 1.8 to less than 2.5, such as 1.8 to 2.2 or 1.9 to 2.1. In some implementations, aromatic polyester polyol (2), which has a functionality of at least 2.5 and an OH number greater than 360 mg KOH/g, has an OH number of greater than 360 to 500 mg KOH/g, greater than 360 to 400 mg KOH/g, or, in some cases, 365 to 385 mg KOH/g, and a functionality of 2.5 to 3.5, such as 2.8 to 3.2 or 2.9 to 3.1, or 3.0.

In the isocyanate-reactive compositions of this specification, the aromatic polyester polyol is present in an amount of at least 50% by weight, based on the total weight of the polyol blend. In some implementations, aromatic polyester polyol is present in an amount of 50 to 85% by weight, such as 50 to 70% by weight, 55 to 65% by weight, or, in some cases, 55 to 60% by weight, based on the total weight of the isocyanate-reactive composition. In some implementations, aromatic polyester polyol present in an amount of 50 to 95% by weight, 70 to 90% by weight, or, in some cases 80 to 90% by weight, based on total weight of polyol blend that is in the isocyanate-reactive composition. In some implementations, aromatic polyester polyol (1) and aromatic polyester polyol (2) are present in the polyol blend in a relative ratio, by weight, of 0.5:1.0 to 2.0:1.0, such as 0.5:1.0 to 1.5:1.0, or 0.8:1.0 to 1.2:1.0, or, in some cases, 1.0:1.0 to 1.2:1.0.

The polyol blend further comprises an amine-initiated polyether polyol, such as an alkanolamine-initiated polyether polyol. As used herein, "alkanolamine-initiated polyether polyol" refers to a polyether polyol prepared by reacting at least one alkylene oxide with one or more suitable starter compounds in the presence of a suitable catalyst, in which the starter compounds comprise one or more alkanolamines. Suitable catalysts including basic catalysts (such as sodium or potassium hydroxide or tertiary amines such as methyl imidazole) and DMC catalysts.

As used herein, the term "alkanolamine" refers to compounds represented by the formula:

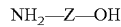

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

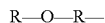

where each R represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Suitable alkylene oxides include ethylene oxide, propylene oxide, butylene oxide, styrene oxide, and epichlorohydrin, as well as mixtures of any two or more thereof.

In some implementations, the amine-initiated, such as alkanolamine-initiated, polyether polyol has an OH number of at least 500 mg KOH/g, such as 500 to 900 mg KOH/g, such as 600 to 800 mg KOH/g, or, in some cases, 680 to 720 mg KOH/g, and a functionality of 2.5 to 4, such as 2.5 to 3.5.

In some implementations, the amine-initiated, such as alkanolamine-initiated, polyether polyol is utilized in an amount of 0.1 to 10% by weight, such as 1 to 10% by weight or 2 to 6% by weight, based upon the total weight of the polyol blend that is in the isocyanate-reactive composition. In some implementations, the amine-initiated, such as alkanolamine-initiated, polyether polyol is present in an amount of 0.1 to 10% by weight, 0.1 to 5% by weight, or, in some cases 1 to 5% by weight, based on the total weight of the isocyanate-reactive composition. In certain implementations, aromatic polyester polyol and amine-initiated, such as alkanolamine-initiated, polyether polyol are present in the polyol blend in a weight ratio of at least 10:1, such as 10:1 to 50:1, or, in some cases 10:1 to 30:1 or 15:1 to 25:1.

The polyol blend may, and often does, include additional polyols. For example, in some implementations, the polyol blend comprises a saccharide-initiated polyether polyol. As used herein, "saccharide-initiated polyether polyol" refers to a polyether polyol prepared by reacting at least one alkylene oxide with one or more suitable starter compounds in the presence of a suitable catalyst, in which the starter compounds comprise one or more saccharide initiators. Examples of suitable alkylene oxides include ethylene oxide, propylene oxide, butylene oxide, styrene oxide, epichlorohydrin, or a mixture of any two or more thereof. Some examples of suitable saccharide initiators are sucrose, sorbitol, maltitol, etc. as well as other mono-saccharides, di-saccharides, tri-saccharides and polysaccharides. Other initiator compounds are often used in combination with the saccharide initiator to prepare the saccharide initiated polyether polyol. Saccharides can be co-initiated with for example, compounds such as water, propylene glycol, glycerin, ethylene glycol, ethanol amines, diethylene glycol, or a mixture of any two or more thereof. As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole) and double metal cyanide (DMC) catalysts.

In some implementations, the saccharide, such as sucrose, is first reacted with ethylene oxide and then propylene oxide. In some cases, the ethylene oxide is used in an amount of 10 to 50%, such as from 20 to 40%, by weight of the total alkylene oxide used and the propylene oxide is used in an amount of from 50 to 90%, such as 60 to 80%, by weight of the total alkylene oxide used. In some implementations, the total amount of alkylene oxide used is selected so that the product has an average molecular weight of 300 to 1600 Da, such as 440 to 1000 Da.

In some implementations, the saccharide initiated polyether polyol has an OH number of from 200 to 600 mg KOH/g, such as 300 to 550 mg KOH/g, such as 400 to 500 mg KOH/g, or, in some cases, 450 to 500 mg KOH/g, and a functionality of 4 to 6, such as 5 to 6, 5.2 to 5.8, or 5.2 to 5.4.

In some implementations, the saccharide-initiated polyether polyol is utilized in an amount of 1 to 20% by weight, such as 5 to 15% by weight, or, in some cases, 8 to 12% by weight, based on the total weight of the polyol blend. In some implementations, the saccharide-initiated polyether polyol is utilized in an amount of 1 to 10% by weight, such as 5 to 10% by weight, or, in some cases, 4 to 8% by weight, based on the total weight of the isocyanate-reactive composition. In certain implementations, the saccharide-initiated polyether polyol is present in an amount such that the ratio, by weight, of aromatic polyester polyol to saccharide-initiated polyether polyol in the polyol blend is at least 2:1, such as 2.0:1.0 to 20.0:1.0, 5.0:1.0 to 15.0:1.0 or, in some cases, 8.0:1.0 to 12.0:1.0. In some implementations, saccharide-initiated polyether polyol and amine-initiated, such as alkanolamine-initiated, polyether polyol are present in the polyol blend in a weight ratio of 0.5:1 to 4:1, 1:1: to 4:1 or 1.5:1 to 2.5:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, diethyltoluenediamine, etc. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain implementations, the polyol blend has a weighted average functionality of 2 to 4, such as 2 to 3 or 2.5 to 3.0, and/or a weighted average hydroxyl number of 300 to 500 mg KOH/g, such as 300 to 400 mg KOH/g.

In certain implementations, the polyol blend comprises less than 20% by weight, less than 10% by weight, less than 5% by weight, or, in some cases, less than 1% by weight, of ethylene oxide, based on the total weight of polyether polyol that is present in the polyol blend.

As indicated earlier, the isocyanate-reactive compositions of this specification further comprises a blowing agent composition. The blowing agent composition comprises: (1) a physical blowing agent comprising HCFO; and (2) a carbon dioxide generating chemical blowing agent.

Suitable HCFOs include 1-chloro-3,3,3-trifluoropropene (HCFO-1233zd, E and/or Z isomers), 2-chloro-3,3,3-trifluoropropene (HCFO-1233xf), HCF01223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

In some implementations, the HCFO is utilized in an amount of at least 10% by weight, such as 10 to 30% by weight or 10 to 20% by weight, based on the total weight of the isocyanate-reactive composition.

In certain implementations, the isocyanate-reactive composition comprises one or more other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane), etc. In other embodiments, the isocyanate-reactive composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). As used herein, the term "substantially free" when used with reference to these blowing agents, means that the blowing agent is present, if at all, in an amount of less than 10% by weight, such as less than 1% by weight, based on the total weight of the blowing agent composition.

As indicated above, the isocyanate-reactive composition comprises a carbon dioxide generating chemical blowing agent, such as water and/or formate-blocked amines. In some of these implementations, the carbon dioxide generating chemical blowing agent, such as water, is utilized in an amount of from 0.5 to 5.0% by weight, such as 1 to 4% by weight, or 1.0 to 3.0% by weight, or 1.5 to 2.0% by weight, based on the total weight of the isocyanate-reactive composition.

In certain implementations, the blowing agent composition comprises HCFO and a carbon dioxide generating chemical blowing agent, such as water, wherein the HCFO and the carbon dioxide generating chemical blowing agent are present in an amount of at least 90% by weight, such as at least 95% by weight, or, in some cases, at least 99% by weight, based on the total weight of the blowing agent composition. In certain implementations, HCFO and carbon dioxide generating chemical blowing agent are present in the blowing agent composition at a weight ratio of at least 2:1, such as at least 5:1, 5:1 to 15:1 or 8:1 to 12:1.

If desired, the blowing agent composition may include other physical blowing agents, such as (a) other hydrofluoroolefins (HFOs), such as pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene; (b) hydrofluorocarbons (c) hydrocarbons, such as any of the pentane isomers and butane isomers; (d) hydrofluoroethers (HFEs); (e) $C_1$ to $C_5$ alcohols, $C_1$ to $C_4$ aldehydes, $C_1$ to $C_4$ ketones, $C_1$ to $C_4$ ethers and diethers and carbon dioxide. Specific examples of such blowing agents are described in United States Patent Application Publication No. US 2014/0371338 A1 at [0051] and [0053], the cited portion of which being incorporated herein by reference.

In some implementations, the isocyanate-reactive composition also comprises a surfactant. Any suitable surfactant can be used, including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some implementations, surfactant is utilized in an amount of 0.2 to 5.0% by weight, such as 1 to 3% by weight, based on the total weight of the isocyanate-reactive composition.

As indicated earlier, the isocyanate-reactive composition further comprises a tertiary amine catalyst. As will be appreciated, tertiary amine catalysts are known as "blow catalysts" since they have a greater effect on the water-polyisocyanate blowing reaction. In some implementations, tertiary amine catalyst comprises a morpholine and/or an imidazole. Suitable morpholine catalysts include, for example, dimorpholinodiethylether, dimorpholinodimethylether, N-ethylmorpholine, and N-methylmorpholine. Suitable imidazole catalysts include, for example, imidazole, n-methylimidazole, and 1,2-dimethylimidazole.

In some implementations of the isocyanate-reactive compositions of this specification, however, the tertiary amine catalyst can be used in a relatively low amounts while still achieve the desired level of reactivity of the water-polyisocyanate blowing reaction. For example, in some implementations, the tertiary amine catalyst, such as the morpholine and/or imidazole, is present in an amount of less than 2% by weight, such as 0.1 to 1.9% by weight, or 0.5 to 1.5% by weight based on the total weight of the isocyanate-reactive composition. In some implementations, the isocyanate-reactive composition comprises a tertiary amine catalyst composition comprising: (1) 80 to 99% by weight, based on the total weight of the tertiary amine catalyst composition, of a morpholine; and (2) 1 to 20% by weight, based on the total weight of the tertiary amine catalyst composition, of an imidazole.

Moreover, in some implementations, the isocyanate-reactive composition can be substantially or, in some cases, completely free of gel catalyst, such as organometallic catalysts (for example dibutyltin dilaurate, dibutyltin diacetate, stannous octoate, potassium octoate, potassium acetate, and potassium lactate) that catalyze the reaction between a polyol and a polyisocyanate. As used herein, the term "substantially free", when used with reference to the absence of a catalyst, means that the catalyst is present in an amount of no more than 0.1% by weight, based on the total weight of the isocyanate-reactive composition.

In certain implementations, the isocyanate-reactive composition further comprises a trimerization catalyst, which is not an amine catalyst. As will be appreciated, a trimerization catalyst is a material that catalyzes the formation of isocyanurate groups from polyisocyanates. This means that isocyanates can react with one another to form macromolecules with isocyanurate structures (polyisocyanurates). The reactions between isocyanates and polyols to form urethanes and isocyanates and isocyanates (homopolymerization) to form isocyanurates can occur at the same time or one after the other to form macromolecules with urethanes and isocyanurates.

Various trimerization catalysts may be suitable. In some implementations, however, the trimerization catalyst comprises a quaternary ammonium salt, such as a quaternary ammonium carboxylate. Useful quaternary ammonium carboxylates include, for example, (2-hydroxypropyl)trimethylammonium 2-ethylhexanoate (Dabco® TMR from Evonik Industries) and (2-hydroxypropyl)trimethylammonium formate (Dabco® TMR-2 from Evonik Industries). In some implementations, the trimerization catalyst is present in the isocyanate-reactive composition in an amount of from 0.25 to 3.0% by weight, such as 0.25 to 1% by weight, based on the total weight of the isocyanate-reactive composition.

Additional materials which may optionally be included in the foam-forming compositions include: pigments, colorants, fillers, antioxidants, flame retardants, and stabilizers. Exemplary flame retardants useful in the foam-forming compositions include, but are not limited to, reactive bromine based compounds known to be used in polyurethane chemistry and chlorinated phosphate esters, including but not limited to, tetrabromophthalate diol (theoretical formula $C_{15}H_{16}O_7Br_4$), tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane-polyisocyanurate ("PUR-PIR") foams. In such processes, a polyisocyanate is reacted with an isocyanate-reactive composition of the type described above. In some implementations, the isocyanate functional component and the isocyanate-reactive composition are mixed at an isocyanate index of from 90 to 150, such as 120 to 150.

In certain implementations, the polyol blend of the isocyanate-reactive composition is reacted with a polyisocyanate in the presence of the blowing agent composition, the catalyst composition, a surfactant and any other optional ingredients. The rigid foams may be prepared by blending all of the components of the isocyanate reactive composition together in a phase stable mixture, and then mixing this in the proper ratio with the polyisocyanate. Alternatively, one or more of the components, such as the surfactant, may be combined with the polyisocyanate prior to mixing it with the isocyanate reactive component. Other possible implementations would include adding one or more of the components as a separate stream, together with the isocyanate reactive component and polyisocyanate. As used herein, the term phase stable means that the isocyanate-reactive composition will not separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the foam-forming mixture, but requires that the isocyanate-reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, and surfactants. Other additives may be added to either the isocyanate prepolymer or remaining polyol or both prior to the mixing of the components, whereby at the end of the reaction, rigid foam is provided.

Furthermore, the rigid foam can be prepared in a batch or continuous process by the one-shot or quasi-prepolymer methods using any well-known foaming apparatus. The rigid foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid foam. Thus, high closed-cell content in the foam is desirable. Foams produced according to implementations of the present specification have more than 80 percent, typically more than 85 percent, or more than 88 percent closed-cell content as measured according to ASTM D6226-15.

This specification also relates to the use of the rigid foams described herein for thermal insulation. That is, the rigid foams of the present specification may find use as an insulating material in refrigeration apparatuses since the combination of good thermal insulation and other properties described herein is particularly appropriate here. The rigid foams can be used, for example, as an intermediate layer in composite elements or for filling hollow spaces of refrigerators and freezers, or refrigerated trailers. The foams may also find use in the construction industry or for thermal insulation of long-distance heating pipes and containers.

As such, this specification also provides a composite article comprising rigid foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the foams produced according to this specification in sandwich composites for trailer floors.

It has been found, surprisingly, that the particular isocyanate-reactive compositions described herein can be particularly suitable for use in discontinuous open pour applications, such as is often used in the production of discontinuous panels or doors, such as garage doors. As will be appreciated, in such a discontinuous process, the reaction mixture (the mixture of the isocyanate-reactive component and the isocyanate-functional component) is poured into a cavity of a mold of the desired part, in which the cavity is lined with a facer, which can be a metal sheet, particle board, plaster board, fiber cement, or a plastic. The foam adheres to the facers as it reacts and cures. The resulting faced panel is then removed from the cavity. To be effectively used in such a process, the reaction mixture must exhibit the right level of reactivity (sufficient to allow for adequate flow of the mixture) resulting from an ideal balance of blow and gel reactivity. As a result, certain implementations of this specification are directed to the use of the reaction mixtures described herein in such a process.

It was discovered, surprisingly, that certain isocyanate-reactive compositions described herein, while having a long shelf life, can produce flame retardant rigid PUR-PIR foams having a good combination of physical properties, even while limiting the amount of tertiary amine blow catalyst used. First, in some implementations, the rigid foams can achieve a Class A fire rating according to ASTM E84-21. Second, the rigid foams can exhibit a thermal conductivity measured at 23° F. (−5° C.) of less than 0.125 BTU-in/h-ft$^2$-° F. as measured according to ASTM C518-15 at a core foam density of 2.0 to 2.2 lb/ft$^3$ (32.0 to 35.2 kg/m$^3$). Third, the isocyanate-reactive composition is phase stable and has a long shelf life. Here, when it is stated that the isocyanate-reactive composition has a "long" shelf life it means that after storing the isocyanate-reactive composition for 6 days (144 hours) at 60° C., when the isocyanate-reactive composition is combined with the polyisocyanate, both (a) the cream and gel times of the foam produced thereby remains within 10% of the initial cream and gel times (the cream and gel times of such a foam if produced immediately and not after storing the isocyanate-reactive composition for 6 days (144 hours) at 60° C.) and (b) the free rise density of the foam produced thereby remains within 10% of the initial free rise density (the free rise density of such a foam is produced immediately and not after storing the isocyanate-reaction composition for 6 days (144 hours) at 60° C.) even in cases where the isocyanate-reactive composition comprises 15 to 20% by weight HCFO, based on the total weight of the isocyanate-reactive composition.

Various aspects of the subject matter described herein are set out in the following numbered clauses:

Clause 1. An isocyanate-reactive composition comprising: (a) a polyol blend comprising: (1) aromatic polyester polyol (I) having a functionality of 1.5 to less than 2.5 and an OH number of 150 to 360 mg KOH/g; (2) an aromatic polyester polyol (II) having a functionality of at least 2.5 and an OH number greater than 360 mg KOH/g, which is present in an amount of at least 10% by weight, based on the total weight of the aromatic polyester polyol in the polyol blend; and (3) an amine-initiated, such as an alkanolamine-initiated, polyether polyol having an OH number of at least 500 mg KOH/g and a functionality of 2.5 to 4, wherein aromatic polyester polyol is present in an amount of at least 50% by weight, based on the total weight of the polyol blend; (b) a blowing agent composition comprising: (1) a hydrochlorofluoroolefin and a carbon dioxide generating chemical blowing agent; and (c) a tertiary amine catalyst.

Clause 2. The isocyanate-reactive composition of clause 1, wherein aromatic polyester polyol (1) has an OH number of 200 to 335 mg KOH/g or 200 to 250 mg KOH/g, and a functionality of 1.8 to less than 2.5, 1.8 to 2.2 or 1.9 to 2.1.

Clause 3. The isocyanate-reactive composition of clause 1 or clause 2, wherein aromatic polyester polyol (2) has an OH number of no more than 500 mg KOH/g, no more than 400 mg KOH/g, or 365 to 385 mg KOH/g, and a functionality of 2.5 to 3.5, 2.8 to 3.2, 2.9 to 3.1, or 3.0.

Clause 4. The isocyanate-reactive composition of one of clause 1 to clause 3, wherein aromatic polyester polyol is present in an amount of 50 to 85% by weight, 50 to 70% by weight, 55 to 65% by weight, or 55 to 60% by weight, based on the total weight of the isocyanate-reactive composition.

Clause 5. The isocyanate-reactive composition of one of clause 1 to clause 4, wherein aromatic polyester polyol present in an amount of 50 to 95% by weight, 70 to 90% by weight, or 80 to 90% by weight, based on total weight of polyol blend that is in the isocyanate-reactive composition.

Clause 6. The isocyanate-reactive composition of one of clause 1 to clause 5, wherein aromatic polyester polyol (1) and aromatic polyester polyol (2) are present in a relative ratio, by weight, of 0.5:1.0 to 2.0:1.0, 0.5:1.0 to 1.5:1.0, 0.8:1.0 to 1.2:1.0, or 1.0:1.0 to 1.2:1.0.

Clause 7. The isocyanate-reactive composition of one of clause 1 to clause 6, wherein the amine-initiated polyether polyol an OH number of 500 to 900 mg KOH/g, 600 to 800 mg KOH/g, or 680 to 720 mg KOH/g, and a functionality of 2.5 to 4 or 2.5 to 3.5.

Clause 8. The isocyanate-reactive composition of one of clause 1 to clause 7, wherein the amine-initiated polyether polyol is present in an amount of 0.1 to 10%, 1 to 10% by weight or 2 to 6% by weight, based upon the total weight of the polyol blend that is in the isocyanate-reactive composition.

Clause 9. The isocyanate-reactive composition of one of clause 1 to clause 8, wherein the amine-initiated polyether polyol is present in an amount of 0.1 to 10% by weight, 0.1 to 5% by weight, or 1 to 5% by weight, based on the total weight of the isocyanate-reactive composition.

Clause 10. The isocyanate-reactive composition of one of clause 1 to clause 9, wherein the aromatic polyester polyol and the amine-initiated polyether polyol are present in a weight ratio of at least 10:1, 10:1 to 50:1, 10:1 to 30:1 or 15:1 to 25:1.

Clause 11. The isocyanate-reactive composition of one of clause 1 to clause 10, wherein the polyol blend further comprises a saccharide-initiated polyether polyol.

Clause 12. The isocyanate-reactive composition of clause 11, wherein the saccharide initiated polyether polyol has an OH number of 200 to 600 mg KOH/g, 300 to 550 mg KOH/g, 400 to 500 mg KOH/g, or 450 to 500 mg KOH/g, and a functionality of 4 to 6, 5 to 6, 5.2 to 5.8, or 5.2 to 5.4.

Clause 13. The isocyanate-reactive composition of clause 11 or clause 12, wherein the saccharide-initiated polyether polyol is present in an amount of 1 to 20% by weight, 5 to 15% by weight, or 8 to 12% by weight, based on the total weight of the polyol blend that is in the isocyanate-reactive composition.

Clause 14. The isocyanate-reactive composition of one of clause 11 to clause 13, wherein the saccharide-initiated polyether polyol is present in an amount of 1 to 10% by weight, 5 to 10% by weight, or 4 to 8% by weight, based on the total weight of the isocyanate-reactive composition.

Clause 15. The isocyanate-reactive composition of one of clause 11 to clause 14, wherein the saccharide-initiated polyether polyol is present in an amount such that the ratio, by weight, of aromatic polyester polyol to saccharide-initiated polyether polyol is at least 2:1, 2.0:1.0 to 20.0:1.0, 5.0:1.0 to 15.0:1.0 or 8.0:1.0 to 12.0:1.0.

Clause 16. The isocyanate-reactive composition of one of clause 11 to clause 15, wherein the saccharide-initiated polyether polyol and the amine-initiated polyether polyol are present in a weight ratio of 0.5:1 to 4:1, 1:1 to 4:1 or 1.5:1 to 2.5:1.

Clause 17. The isocyanate-reactive composition of one of clause 1 to clause 16 wherein the polyol blend has a weighted average functionality of 2 to 4, 2 to 3 or 2.5 to 3.0, and/or a weighted average hydroxyl number of from 300 to 500 mg KOH/g or 300 to 400 mg KOH/g.

Clause 18. The isocyanate-reactive composition of one of clause 1 to clause 17, wherein the polyol blend comprises less than 20% by weight, less than 10% by weight, less than 5% by weight, or less than 1% by weight, of ethylene oxide, based on the total weight of polyether polyol that is present in the polyol blend.

Clause 19. The isocyanate-reactive composition of one of clause 1 to clause 18, wherein the hydrochlorofluoroolefin comprises 1-chloro-3,3,3-trifluoropropene (HCFO-1233zd, E and/or Z isomers), 2-chloro-3,3,3-trifluoropropene (HCFO-1233xf), HCF01223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), or 2-chloro-1,1,1,3,4,4,4-heptafluorobutene-2 (E and/or Z isomers).

Clause 20. The isocyanate-reactive composition of one of clause 1 to clause 19, wherein the hydrochlorofluoroolefin has a boiling point, at atmospheric pressure, of at least −25° C., at least −20° C., or at least −19° C., and 40° C. or less, 35° C. or less, or 33° C. or less, such as where the hydrochlorofluoroolefin has a boiling point, at atmospheric pressure, of −25° C. to 40° C., −20° C. to 35° C., or −19° C. to 33° C.

Clause 21. The isocyanate-reactive composition of one of clause 1 to clause 20, wherein the hydrochlorofluoroolefin is present in an amount of at least 10% by weight, 10 to 30% by weight or 10 to 20% by weight, based on the total weight of the isocyanate-reactive composition.

Clause 22. The isocyanate-reactive composition of one of clause 1 to clause 21, wherein the isocyanate-reactive composition substantially, or completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane).

Clause 23. The isocyanate-reactive composition of one of clause 1 to clause 22, wherein the carbon dioxide generating chemical blowing agent comprises water, such as where water is present in an amount of from 0.5 to 5.0% by weight, 1 to 4% by weight, 1.0 to 3.0% by weight, or 1.5 to 2.0% by weight, based on the total weight of the isocyanate-reactive composition.

Clause 24. The isocyanate-reactive composition of one of clause 1 to clause 24, wherein the hydrochlorofluoroolefin and carbon dioxide generating chemical blowing agent are present in an amount of at least 90% by weight, at least 95% by weight, or at least 99% by weight, based on the total weight of the blowing agent composition.

Clause 25. The isocyanate-reactive composition of one of clause 1 to clause 24, wherein the hydrochlorofluoroolefin and carbon dioxide generating chemical blowing agent are present in the blowing agent composition at a weight ratio of at least 2:1, at least 5:1, 5:1 to 15:1 or 8:1 to 12:1.

Clause 26. The isocyanate-reactive composition of one of clause 1 to clause 25, wherein the tertiary amine catalyst comprises a morpholine and/or an imidazole, such as where the morpholine comprises dimorpholinodiethylether, dimorpholinodimethylether, N-ethylmorpholine, or N-methylmorpholine and/or the imidazole comprises imidazole, n-methylimidazole, or 1,2-dimethylimidazole.

Clause 27. The isocyanate-reactive composition of one of clause 1 to clause 26, wherein the tertiary amine catalyst is present in an amount of less than 2% by weight, such as 0.1 to 1.9% by weight, or 0.5 to 1.5% by weight based on the total weight of the isocyanate-reactive composition.

Clause 28. The isocyanate-reactive composition of one of clause 1 to clause 27, wherein the tertiary amine catalyst composition comprises: (1) 80 to 99% by weight, based on the total weight of the tertiary amine catalyst composition, of a morpholine; and (2) 1 to 20% by weight, based on the total weight of the tertiary amine catalyst composition, of an imidazole.

Clause 29. The isocyanate-reactive composition of one of clause 1 to clause 28, wherein the isocyanate-reactive composition is substantially or completely free of organometallic gel catalysts (for example dibutyltin dilaurate, dibutyltin diacetate, stannous octoate, potassium octoate, potassium acetate, and potassium lactate).

Clause 30. The isocyanate-reactive composition of one of clause 1 to clause 29, wherein the isocyanate-reactive composition further comprises a trimerization catalyst, such as a quaternary ammonium salt, such as a quaternary ammonium carboxylate, such as (2-hydroxypropyl)trimethylammonium 2-ethylhexanoate and (2-hydroxypropyl)trimethylammonium formate, such as where the trimerization catalyst is present in an amount of from 0.25 to 3.0% by weight or 0.25 to 1% by weight, based on the total weight of the isocyanate-reactive composition.

Clause 31. The isocyanate-reactive composition of one of clause 1 to clause 30, further comprising a reactive bromine based compound and/or a chlorinated phosphate esters, such as tetrabromophthalate diol, tri(2-chloroethyl)phosphate (TECP), tri(1,3-dichloro-2-propyl)phosphate, tri(1-chloro-2-propyl)phosphate (TCPP) or dimethyl propyl phosphate (DMPP).

Clause 32. A polyurethane foam-forming reaction mixture comprising the isocyanate-reactive composition of one of clause 1 to clause 31 and a polyisocyanate, such as where the polyisocyanate comprises m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, an isomer of hexahydro-toluene diisocyanate, isophorone diisocyanate, a dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; 4,4'-dimethyl-diphenylmethane-2,2', 5,5'-tetraisocyanate or the polymethylene polyphenylpolyisocyanates.

Clause 33. The polyurethane foam-forming composition of clause 32, wherein the polyisocyanate comprises a methylene-bridged polyphenyl polyisocyanate and/or a prepolymer of methylene-bridged polyphenyl polyisocyanates having an average functionality of 1.8 to 3.5 or 2.0 to 3.1, isocyanate moieties per molecule, and an NCO content of 25 to 32 weight percent.

Clause 34. A method of forming a foam, comprising mixing a polyisocyanate with the isocyanate-reactive composition of one of clause 1 to clause 31 at an isocyanate index of from 90 to 150, such as 120 to 150.

Clause 35. The method of clause 34, wherein the mixture is poured into a cavity of a mold of a desired part, in which the cavity is lined with a facer, such as a metal sheet, particle board, plaster board, fiber cement, or a plastic, the foam adheres to the facers as it reacts and cures, and the resulting faced panel is then removed from the cavity.

Clause 36. A foam produced by the method of clause 34 or clause 35.

Clause 37. A composite article comprising the foam of clause 36 sandwiched between one or more facer substrates, such as where the facer substrate comprises plastic, such a polypropylene resin reinforced with continuous bi-directional glass fibers or a fiberglass reinforced polyester copolymer, paper, wood, or metal.

Clause 38. The foam of clause 36 or the composite article of clause 37, wherein the foam achieves an ASTM E-84 Class A fire rating.

Clause 39. The foam of clause 36 or the composite article of clause 38, wherein the foam exhibits a thermal conductivity measured at 23° F. (−5° C.) of less than 0.125 BTU-in/h-ft2-° F. as measured according to ASTM C518-15 at a core foam density of 2.0 to 2.2 lb/ft3 (32.0 to 35.2 kg/m3).

Clause 40. A foam-forming reaction mixture comprising: (a) a polyisocyanate; (b) a polyol blend comprising: (1) an aromatic polyester polyol (I) having a functionality of 1.5 to less than 2.5 and an OH number of 150 to 360 mg KOH/g; (2) an aromatic polyester polyol (II) having a functionality of at least 2.5 and an OH number greater than 360 mg KOH/g, which is present in an amount of at least 10% by weight, based on the total weight of the aromatic polyester polyol in the polyol blend; and (3) an amine-initiated, such as an alkanolamine-initiated, polyether polyol having an OH number of at least 500 mg KOH/g and a functionality of 2.5 to 4, wherein aromatic polyester polyol is present in an amount of at least 50% by weight, based on the total weight of the polyol blend; (c) a blowing agent composition comprising: (1) a hydrochlorofluoroolefin and a carbon dioxide generating chemical blowing agent; and (d) a tertiary amine catalyst, wherein the reaction mixture has an isocyanate index of 90 to 150, such as 120 to 150.

Clause 41. The foam-forming reaction mixture of clause 40, wherein aromatic polyester polyol (I) has an OH number of 200 to 335 mg KOH/g or 200 to 250 mg KOH/g, and a functionality of 1.8 to less than 2.5, 1.8 to 2.2 or 1.9 to 2.1.

Clause 42. The foam-forming reaction mixture of clause 40 or clause 41, wherein aromatic polyester polyol (II) has an OH number of no more than 500 mg KOH/g, no more than 400 mg KOH/g, or 365 to 385 mg KOH/g, and a functionality of 2.5 to 3.5, 2.8 to 3.2, 2.9 to 3.1, or 3.0.

Clause 43. The foam-forming reaction mixture of one of clause 40 to clause 42, wherein aromatic polyester polyol present in an amount of 50 to 95% by weight, 70 to 90% by weight, or 80 to 90% by weight, based on total weight of the polyol blend.

Clause 44. The foam-forming reaction mixture of one of clause 40 to clause 43, wherein aromatic polyester polyol (I) and aromatic polyester polyol (II) are present in a relative ratio, by weight, of 0.5:1.0 to 2.0:1.0, 0.5:1.0 to 1.5:1.0, 0.8:1.0 to 1.2:1.0, or 1.0:1.0 to 1.2:1.0.

Clause 45. The foam-forming reaction mixture of one of clause 40 to clause 44, wherein the amine-initiated polyether polyol has an OH number of 500 to 900 mg KOH/g, 600 to 800 mg KOH/g, or 680 to 720 mg KOH/g, and a functionality of 2.5 to 4 or 2.5 to 3.5.

Clause 46. The foam-forming reaction mixture of one of clause 40 to clause 45, wherein the amine-initiated polyether polyol is present in an amount of 0.1 to 10%, 1 to 10% by weight or 2 to 6% by weight, based upon the total weight of the polyol blend.

Clause 47. The foam-forming reaction mixture of one of clause 40 to clause 46, wherein aromatic polyester polyol and amine-initiated polyether polyol are present in a weight ratio of at least 10:1, 10:1 to 50:1, 10:1 to 30:1 or 15:1 to 25:1.

Clause 48. The foam-forming reaction mixture of one of clause 40 to clause 47, wherein the polyol blend further comprises a saccharide-initiated polyether polyol having an OH number of 200 to 600 mg KOH/g, 300 to 550 mg KOH/g, 400 to 500 mg KOH/g, or 450 to 500 mg KOH/g, and a functionality of 4 to 6, 5 to 6, 5.2 to 5.8, or 5.2 to 5.4.

Clause 49. The foam-forming reaction mixture of clause 48, wherein the saccharide-initiated polyether polyol is present in an amount of 1 to 20% by weight, 5 to 15% by weight, or 8 to 12% by weight, based on the total weight of the polyol blend.

Clause 50. The foam-forming reaction mixture of clause 48 or clause 49, wherein the saccharide-initiated polyether polyol is present in an amount such that the ratio, by weight, of aromatic polyester polyol to saccharide-initiated polyether polyol is at least 2:1, 2.0:1.0 to 20.0:1.0, 5.0:1.0 to 15.0:1.0 or 8.0:1.0 to 12.0:1.0.

Clause 51. The foam-forming reaction mixture of one of clause 48 to clause 50, wherein saccharide-initiated polyether polyol and amine-initiated polyether polyol are present in a weight ratio of 0.5:1 to 4:1, 1:1: to 4:1 or 1.5:1 to 2.5:1.

Clause 52. The foam-forming reaction mixture of one of clause 40 to clause 51 wherein the polyol blend has a weighted average functionality of 2 to 4, 2 to 3 or 2.5 to 3.0, and/or a weighted average hydroxyl number of from 300 to 500 mg KOH/g or 300 to 400 mg KOH/g.

Clause 53. The foam-forming reaction mixture of one of clause 40 to clause 52, wherein the polyol blend comprises less than 20% by weight, less than 10% by weight, less than 5% by weight, or less than 1% by weight, of ethylene oxide, based on the total weight of polyether polyol that is present in the polyol blend.

Clause 54. The foam-forming reaction mixture of one of clause 40 to clause 53, wherein the hydrochlorofluoroolefin comprises 1-chloro-3,3,3-trifluoropropene (HCFO-1233zd, E and/or Z isomers), 2-chloro-3,3,3-trifluoropropene (HCFO-1233xf), HCF01223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), or 2-chloro-1,1,1,3,4,4,4-heptafluorobutene-2 (E and/or Z isomers).

Clause 55. The foam-forming reaction mixture of one of clause 40 to clause 54, wherein the hydrochlorofluoroolefin has a boiling point, at atmospheric pressure, of at least −25° C., at least −20° C., or at least −19° C., and 40° C. or less, 35° C. or less, or 33° C. or less, such as where the hydrochlorofluoroolefin has a boiling point, at atmospheric pressure, of −25° C. to 40° C., −20° C. to 35° C., or −19° C. to 33° C.

Clause 56. The foam-forming reaction mixture of one of clause 40 to clause 55, wherein the hydrochlorofluoroolefin is present in an amount of at least 10% by weight, 10 to 30% by weight or 10 to 20% by weight, based on the total weight of the foam-forming reaction mixture except for the weight of the polyisocyanate.

Clause 57. The foam-forming reaction mixture of one of clause 40 to clause 56, wherein the foam-forming reaction mixture is substantially, or completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane).

Clause 58. The foam-forming reaction mixture of one of clause 40 to clause 57, wherein the carbon dioxide generating chemical blowing agent comprises water, such as where water is present in an amount of from 0.5 to 5.0% by weight, 1 to 4% by weight, 1.0 to 3.0% by weight, or 1.5 to 2.0% by weight, based on the total weight of the foam-forming reaction mixture except for the weight of the polyisocyanate.

Clause 59. The foam-forming reaction mixture of one of clause 40 to clause 58, wherein the hydrochlorofluoroolefin and carbon dioxide generating chemical blowing agent are present in an amount of at least 90% by weight, at least 95% by weight, or at least 99% by weight, based on the total weight of the blowing agent composition.

Clause 60. The foam-forming reaction mixture of one of clause 40 to clause 59, wherein the hydrochlorofluoroolefin and carbon dioxide generating chemical blowing agent are present in the blowing agent composition at a weight ratio of at least 2:1, at least 5:1, 5:1 to 15:1 or 8:1 to 12:1.

Clause 61. The foam-forming reaction mixture of one of clause 40 to clause 60, wherein the tertiary amine catalyst comprises a morpholine and/or an imidazole, such as where the morpholine comprises dimorpholinodiethylether, dimorpholinodimethylether, N-ethylmorpholine, or N-methylmorpholine and/or the imidazole comprises imidazole, n-methylimidazole, or 1,2-dimethylimidazole.

Clause 62. The foam-forming reaction mixture of one of clause 40 to clause 61, wherein the tertiary amine catalyst is present in an amount of less than 2% by weight, such as 0.1 to 1.9% by weight, or 0.5 to 1.5% by weight based on the total weight of the foam-forming reaction mixture except for the weight of the polyisocyanate.

Clause 63. The foam-forming reaction mixture of one of clause 40 to clause 62, wherein the tertiary amine catalyst composition comprises: (1) 80 to 99% by weight, based on the total weight of the tertiary amine catalyst composition, of a morpholine; and (2) 1 to 20% by weight, based on the total weight of the tertiary amine catalyst composition, of an imidazole.

Clause 64. The foam-forming reaction mixture of one of clause 40 to clause 63, wherein the foam-forming reaction mixture is substantially or completely free of organometallic gel catalysts (for example dibutyltin dilaurate, dibutyltin diacetate, stannous octoate, potassium octoate, potassium acetate, and potassium lactate).

Clause 65. The foam-forming reaction mixture of one of clause 40 to clause 64, further comprising a trimerization catalyst, such as a quaternary ammonium salt, such as a quaternary ammonium carboxylate, such as (2-hydroxypropyl)trimethylammonium 2-ethylhexanoate and (2-hydroxypropyl)trimethylammonium formate, such as where the trimerization catalyst is present in an amount of from 0.25 to 3.0% by weight or 0.25 to 1% by weight, based on the total weight of the foam-forming reaction mixture except for the weight of the polyisocyanate.

Clause 66. The foam-forming reaction mixture of one of clause 40 to clause 65, further comprising a reactive bromine based compound and/or a chlorinated phosphate esters, such as tetrabromophthalate diol, tri(2-chloroethyl)phosphate (TECP), tri(1,3-dichloro-2-propyl)phosphate, tri(1-chloro-2-propyl)phosphate (TCPP) or dimethyl propyl phosphate (DMPP).

Clause 67. The foam-forming reaction mixture of one of clause 40 to clause 66, wherein the polyisocyanate comprises a methylene-bridged polyphenyl polyisocyanate and/or a prepolymer of methylene-bridged polyphenyl polyisocyanates having an average functionality of 1.8 to 3.5 or 2.0 to 3.1, isocyanate moieties per molecule, and an NCO content of 25 to 32 weight percent.

Clause 68. A foam comprising the reaction product of the foam-forming reaction mixture of one of clause 40 to clause 67.

Clause 69. A method of forming a foam, comprising pouring the foam-forming reaction mixture of one of clause 40 to clause 67 into a cavity of a mold of a desired part, in which the cavity is lined with a facer, such as a metal sheet, particle board, plaster board, fiber cement, or a plastic, the foam adheres to the facers as it reacts and cures, and the resulting faced panel is then removed from the cavity.

Clause 70. A composite article comprising the foam of clause 68 or produced by the method of clause 69, wherein the foam is sandwiched between one or more facer substrates, such as where the facer substrate comprises plastic, such a polypropylene resin reinforced with continuous bi-directional glass fibers or a fiberglass reinforced polyester copolymer, paper, wood, or metal.

Clause 71. The foam of clause 68 or the composite article of clause 70, wherein the foam achieves an ASTM E-84 Class A fire rating.

Clause 72. The foam of clause 68 or the composite article of clause 71, wherein the foam exhibits a thermal conductivity measured at 23° F. (−5° C.) of less than 0.125 BTU-in/h-ft$^2$-° F. as measured according to ASTM C518-15 at a core foam density of 2.0 to 2.2 lb/ft$^3$ (32.0 to 35.2 kg/m$^3$).

The non-limiting and non-exhaustive examples that follow are intended to further describe various non-limiting and non-exhaustive implementations without restricting the scope of the implementations described in this specification.

Examples

Foam-forming compositions were prepared using the ingredients and amounts (in parts by weight) set forth in Table 1. The following materials were used:

POLYOL 0: an aromatic polyester polyol having an OH number of 240 mg KOH/g and a functionality of 2. Commercially available from Stepan as Stepanpol® PS-2352;

POLYOL 1: an aromatic polyester polyol having an OH number of 225 to 245 mg KOH/g and a functionality of 2, commercially available from Invista as Terate® HT-5500;

POLYOL 2: a sucrose and propylene glycol initiated polyether polyol (100% propylene oxide as the alkylene oxide) having an OH number of 450-490 mg KOH/g and a functionality of 5.2;

POLYOL 3: a monoethanolamine-initiated polyether polyol having an OH number of 685 to 715, a functionality of 3, and a nitrogen content of 5.8% by weight, prepared by propoxylating monoethanolamine;

POLYOL 4: a saturated aromatic terephthalate polyester polyol having an OH number of about 375 mg KOH/g and a functionality of about 3, commercially available from Coim as Isoexter® TB-375;

SURFACTANT 1: a non-hydrolysable polyether polydimethylsiloxane copolymer commercially available from Evonik under the trade name Tegostab® B8465;

SURFACTANT 2: a non-hydrolysable polyether polydimethylsiloxane copolymer commercially available from Evonik under the trade name Tegostab® B84725;

CATALYST 1: 2,2'-dimorpholinodiethylether (JEFFCAT® DMDEE from Huntsman);

CATALYST 2: (2-hydroxypropyl)trimethylammonium formate commercially available as Dabco® TMR-2 from Evonik Industries;

CATALYST 3: 1,2-dimethylimidazole (DABCO® 2040 from Evonik); CATALYST 4: a formic acid blocked quaternary ammonium salt available as Dabco® TMR-3 from Evonik Industries;

ADDITIVE 1: alkyl phosphate flame retardant based on Tris(2-chloroisopropyl) phosphate commercially available from ICL Industrial Products as Fyrol® PCF;

ADDITIVE 2: a reactive bromine-containing diester/ether diol of tetrabromophthalic anhydride commercially available from Albemarle Corporation as Saytex® RB-79;

HCFO: trans-1,1,1-trifluoro-3-chloropropene, a hydrochlorofluoroolefin blowing agent which has a boiling point of 19° C. that is commercially available from Honeywell International Inc. as Solstice® LBA; and ISOCYANATE: a high functionality polymeric diphenylmethane diisocyanate (PMDI) with a NCO content of 30.0 to 31.4% and a viscosity of 610 to 730 centipoise at 25° C.

In each case a master batch was prepared by mixing the polyols, catalysts, surfactant, water and blowing agents in the amounts indicated in Table 1 foams were prepared by mixing the masterbatch with the amount of isocyanate indicated in Table 1 and pouring the mixture into an 83 ounce paper cup. The cream time, gel time, tack-free time and free rise density (FRD) were recorded. Foams were prepared after initially preparing the master batch and also after aging the for a minimum of 6 days at 60° C. to assess shelf life. Results are set forth in Table 1 (reported results represent the average results of three replicate experiments). N/A indicates that a representative sample was not tested.

Foams were also prepared using a Hennecke HK-1250 high-pressure foam machine. The liquid output was maintained at a constant 27° C. for both Polyol and Isocyanate side with an output range of 454 to 653 grams/second. Foam was shot into a 2'×6'×4" (61×183×5.1 cm) mold between heated platens with a target density of 2.1 pcf (33.6 kg/m$^3$). The platens were maintained at 49° C. The foam remained in the mold and was allowed to cure for 30 minutes at 49° C. before removing. The resultant foam panels were then tested by an independent laboratory for ASTM E-84 classification. A 8"×8'×1" section of foam was sampled from the panels and used for k-factor testing according to ASTM C518. Results can be seen in Table 2.

TABLE 1

| Component | Example # 1 | 2 | 3 | 4 | 5 | 6 |
|---|---|---|---|---|---|---|
| POLYOL 0 | 23.95 | — | — | — | — | — |
| POLYOL 1 | — | 34.25 | 40.25 | 24 | 31 | 30.5 |
| POLYOL 2 | 20 | 13.00 | 13 | 6.5 | 6.5 | 6 |
| POLYOL 3 | 9 | 9 | 9 | 3 | 3 | 3 |
| POLYOL 4 | — | — | — | 26 | 28 | 27 |
| SURFACTANT 1 | 2.45 | 2.25 | 2.25 | 2.2 | — | — |
| SURFACTANT 2 | — | — | — | — | 2.1 | 2.1 |
| CATALYST 1 | 1.1 | 1 | 1 | 1.1 | 1.1 | 1.1 |
| CATALYST 2 | 0.4 | 0.45 | 0.45 | 0.45 | 0.45 | 0.45 |
| CATALYST 3 | — | — | — | 0.07 | 0.1 | 0.1 |
| CATALYST 4 | 1.5 | — | — | — | — | — |
| ADDITIVE 1 | 12 | 12 | 12 | 11.18 | 5 | 5 |
| ADDITIVE 2 | 12 | 12 | 6 | 8 | 5 | 5 |
| Water | 2.6 | 2.3 | 2.3 | 2 | 1.75 | 1.75 |
| HCFO | 15 | 13.75 | 13.75 | 15.5 | 16 | 18 |
| Total parts | 100 | 100 | 100 | 100 | 100 | 100 |
| ISOCYANATE | 152 | 120 | 120 | 116 | 116 | 110 |
| Index | 150 | 130 | 130 | 130 | 135 | 135 |
| Cream time (sec) | 21 | 21 | 25 | 24 | 26 | 27 |
| Gel time (sec) | 108 | 113 | 132 | 123 | 120 | 120 |
| Free Rise Density (kg/m$^3$) | 28.5 | 25.8 | 30.3 | 29.6 | 30.9 | 27.7 |
| Polyol shelf life (Days) | 12 | 6 | N/A | N/A | N/A | 12 |

TABLE 2

| | Example # 1 | 2 | 3 | 4 | 5 | 6 |
|---|---|---|---|---|---|---|
| Panel Density (kg/m$^3$) | 33.6 | 33.6 | 33.6 | 33.6 | 33.6 | 33.6 |
| k- factor @ −5° C. (mW/m · K) | 18.0 | 18.0 | 18.0 | 17.9 | 18.0 | 17.4 |
| ASTM E84 Flame spread index | 290* | 20 | 25 | 15 | 25 | 15 |
| ASTM E84 Smoke index | 600* | 800 | 850 | 650 | 400 | 400 |

*E-84 test was terminated before the normal 10 minute period due excessive heat and flame in the tunnel during the test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition comprising:
    (a) a polyol blend comprising:
        (1) an aromatic polyester polyol having a functionality of 1.5 to less than 2.5 and an OH number of 150 to 360 mg KOH/g;
        (2) an aromatic polyester polyol having a functionality of at least 2.5 and an OH number greater than 360 mg KOH/g, which is present in an amount of at least 10% by weight, based on total weight of aromatic polyester polyol in the polyol blend; and
        (3) an amine-initiated polyether polyol having an OH number of at least 500 mg KOH/g and a functionality of 2.5 to 4;
    wherein aromatic polyester polyol is present in an amount of at least 50% by weight, based on total weight of the polyol blend;
    (b) a blowing agent composition comprising:
        (1) a hydrochlorofluoroolefin; and
        (2) a carbon dioxide generating chemical blowing agent; and
    (c) a tertiary amine catalyst.

2. The isocyanate-reactive composition of claim 1, wherein the aromatic polyester polyol (1) has an OH number of 200 to 335 mg KOH/g and a functionality of 1.8 to 2.2, and the aromatic polyester polyol (2) has an OH number of no more than 500 mg KOH/g and a functionality of 2.8 to 3.2.

3. The isocyanate-reactive composition of claim 1, wherein the aromatic polyester polyol (1) and the aromatic polyester polyol (2) are present in a relative ratio, by weight, of 0.5:1.0 to 2.0:1.0.

4. The isocyanate-reactive composition of claim 1, wherein the amine-initiated polyether polyol comprises an alkanolamine-initiated polyether polyol present in an amount of 0.1 to 10% by weight, based on total weight of the polyol blend.

5. The isocyanate-reactive composition of claim 4, wherein the aromatic polyester polyol and the alkanolamine-initiated polyether polyol are present in a weight ratio of 10:1 to 50:1.

6. The isocyanate-reactive composition of claim 1, wherein the polyol blend further comprises a saccharide-initiated polyether polyol having an OH number of 200 to 600 mg KOH/g and a functionality of 4 to 6, wherein the saccharide-initiated polyether polyol is present in an amount of 1 to 20% by weight, based on total weight of the polyol blend.

7. The isocyanate-reactive composition of claim 6, wherein the ratio, by weight, of aromatic polyester polyol to saccharide-initiated polyether polyol in the polyol blend is at least 2:1 and the ratio, by weight, of saccharide-initiated polyether polyol to amine-initiated polyether polyol in the polyol blend is 0.5:1 to 4:1.

8. The isocyanate-reactive composition of claim 1, wherein the hydrochlorofluoroolefin comprises 1-chloro-3,3,3-trifluoropropene present in an amount of 10 to 30% by weight, based on total weight of the isocyanate-reactive composition.

9. The isocyanate-reactive composition of claim 1, wherein the carbon dioxide generating chemical blowing agent comprises water present in an amount of 1.0 to 3.0% by weight, based on total weight of the isocyanate-reactive composition, and the hydrochlorofluoroolefin and water are present in an amount of at least 90% by weight, based on total weight of the blowing agent composition.

10. The isocyanate-reactive composition of claim 1, wherein:
(a) the tertiary amine catalyst composition comprises:
(1) 80 to 99% by weight, based on total weight of the tertiary amine catalyst composition, of a morpholine; and
(2) 1 to 20% by weight, based on total weight of the tertiary amine catalyst composition, of an imidazole; and
(b) the isocyanate-reactive composition further comprises a trimerization catalyst comprising quaternary ammonium salt that is present in an amount of from 0.25 to 3.0% by weight, based on total weight of the isocyanate-reactive composition.

11. A method of forming a foam, comprising mixing a polyisocyanate with the isocyanate-reactive composition of claim 1 at an isocyanate index of 120 to 150.

* * * * *